D. REDMON.
METHOD OF PRODUCING MATERIAL FOR ORNAMENTAL WOODWORK.
APPLICATION FILED SEPT. 2, 1914.

1,154,806.

Patented Sept. 28, 1915
2 SHEETS—SHEET 1.

Witnesses
Oscar V. Payne
Harry E. Coleman

Inventor
D. Redmon
By Herbert J. Jacobi
Attorney

D. REDMON.
METHOD OF PRODUCING MATERIAL FOR ORNAMENTAL WOODWORK.
APPLICATION FILED SEPT. 2, 1914.

1,154,806.

Patented Sept. 28, 1915.
2 SHEETS—SHEET 2.

Witnesses
Oscar V. Payne
Harry E. Coleman

Inventor
D. Redmon
By Herbert J. Jacobi
Attorney

UNITED STATES PATENT OFFICE.

DILLARD REDMON, OF BALTIMORE, MARYLAND.

METHOD OF PRODUCING MATERIAL FOR ORNAMENTAL WOODWORK.

1,154,806.   Specification of Letters Patent.   Patented Sept. 28, 1915.

Application filed September 2, 1914. Serial No. 859,874.

*To all whom it may concern:*

Be it known that I, DILLARD REDMON, a citizen of the United States of America, residing at Baltimore, in the State of Maryland, have invented certain new and useful Improvements in Methods of Producing Material for Ornamental Woodwork, of which the following is a specification.

This invention relates to new material for the manufacture of cabinet wares and other ornamental woodwork and more particularly to a new and novel process for the making thereof.

The primary object of the invention is to provide a new process for the manufacture of a material consisting of layers of veneers of varied and contrasted colors so applied and cut as to give the effect of graining when completed.

A further object of the invention is to provide a process which prevents waste of material, thus economizing in the process, and a still further object resides in providing a process which is time and labor saving, as compared with other processes of this character, thus providing a generally inexpensive method of manufacture.

With these and numerous other objects in view my invention consists in the various steps as will be hereinafter referred to and more particularly pointed out in the specification and claim.

Figure 1:
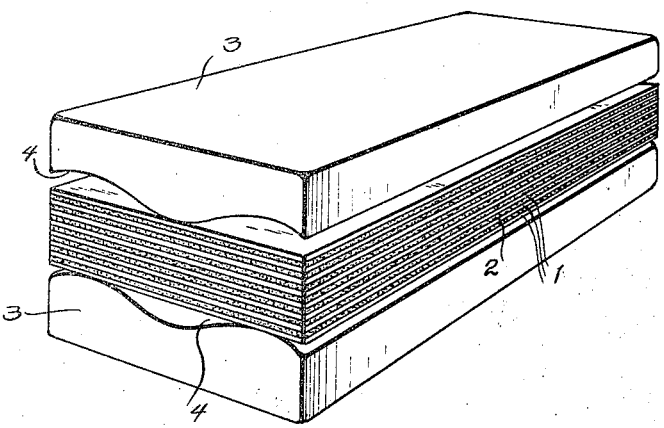
Figure 2:
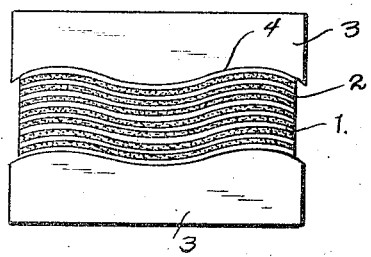
Figure 6:
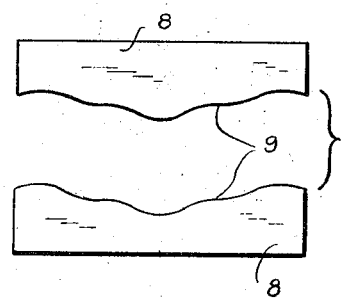
Figure 3:
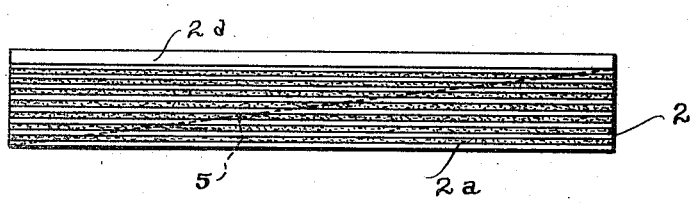
Figure 4:
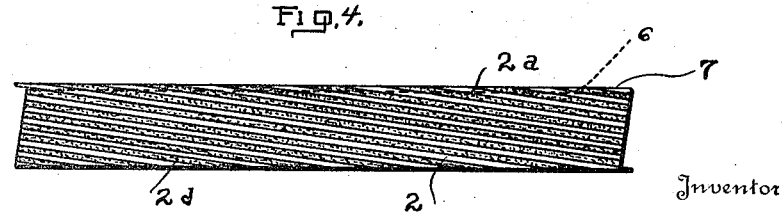
Figure 8:
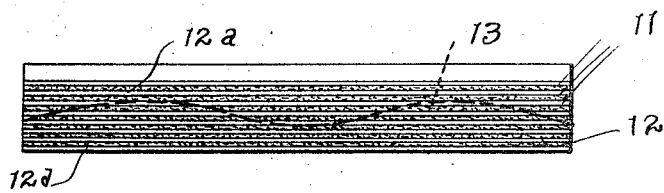
Figure 6:
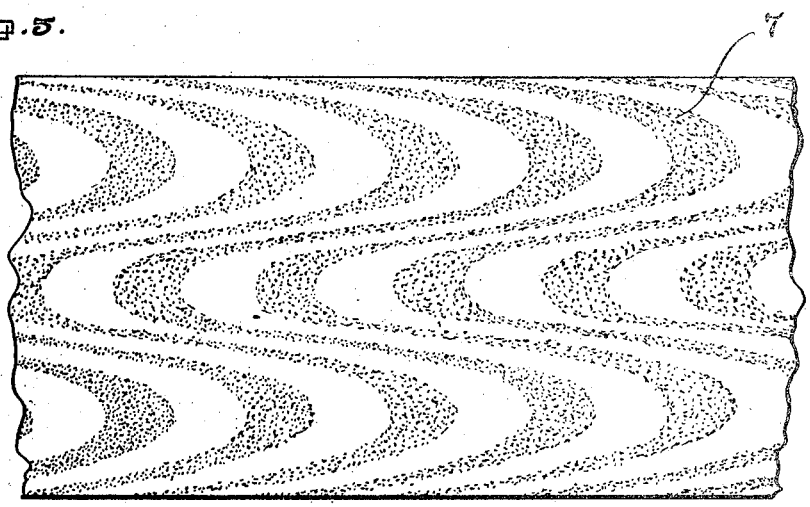
Figure 7:
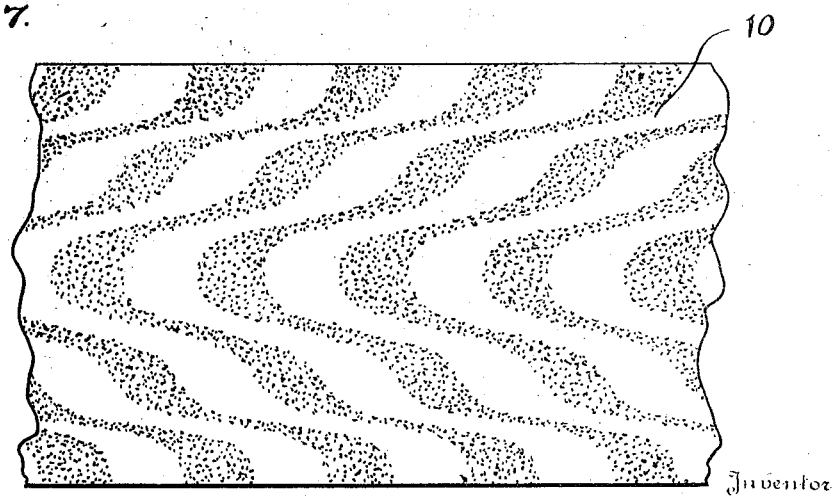

In the accompanying drawings forming a part of this application, Figure 1 is a perspective view of a plank formed of veneers and placed in the mold, about to be shaped, in the first operation of the device; Fig. 2 is an end elevation thereof, with the mold applied; Fig. 3 is a side elevation of the plank just removed from the mold and showing in dotted lines the diagonal cut about to be made therethrough; Fig. 4 is a similar view after the diagonal cut has been made and showing the sections or prisms reversely applied on one another; Fig. 5 is a plan view of a segment cut longitudinally through the device shown in Fig. 4; Fig. 6 is a slightly modified form of mold which may be used in the process; Fig. 7 is a plan view of a segment finally cut from a plank which has been formed through the use of a mold as shown in Fig. 6; and Fig. 8 is a side elevation of plank showing a modified diagonal cut made therethrough.

In describing the invention I shall refer to the drawings in which similar reference characters designate corresponding parts throughout the several views and in which 1 designates a plurality of thin layers of veneer of divers and contrasting colors alternately applied in parallel relation and secured together, as by gluing, to form a plank or the like, 2. In the drawings I have shown veneers of but two colors but it will be understood that veneers of as many different colors may be used, as are found desirable.

After forming the plank or board 2 of the material as described, the same is placed between the sections of a mold 3 and compressed tightly, as shown in Fig. 2 of the drawings. The inner faces of the sections of the mold are transversely corrugated as indicated at 4, which corrugations extend the full length thereof and when the plank or board 2 is compressed therebetween the same takes this configuration. When removed from the mold or press the plank 2 is in a form as shown in Fig. 3, and at this stage the plank is cut diagonally along a line which in the drawings, Fig. 3, is dotted and designated as 5. In cutting the plank in this manner a lower and upper section $2^a$ and $2^d$, respectively, are formed, which in the next step in the process are reversed in position or matched, that is, the outer opposed faces of the sections $2^a$ and $2^d$ are brought in contact with one another, so that the corrugated faces thereof match or fit one within the other. These sections are then glued or otherwise similarly secured together and the plank in this form is shown in Fig. 4 of the drawings.

From the plank or board so formed, longitudinal layers or segments 7, of any desired thickness, are cut along horizontal planes, the line of cutting for the first layer being indicated in Fig. 4, by the dotted line 6.

By first cutting the plank on a diagonal plane, matching the sections and then cutting the resulting plank along a horizontal plane, the final line of cutting is oblique to the plane of the layers. This produced an effect sufficiently varied to be ornamental and by a suitable distribution of the different kinds of wood, of agreeably contrasting colors and texture, very beautiful and striking effects may be produced. Such an effect is shown by the layer 7 in Fig. 5 which illustrates a plan view of one of the layers finally cut from the plank.

In Fig. 6, I have shown a slightly modified form of mold or compressor to be used in the first step of the process. This mold is indicated as 8 and differs from the mold 3 in that its corrugated inner faces indicated as 9 are more or less irregular and not one continuous wave or curve as in the first mentioned mold. The result of the process using this form of mold is clearly shown by the layer 10 illustrated in Fig. 7 of the drawings.

In Fig. 8 I have shown a still further modification of the invention wherein a plank 12 consisting of the layers of veneer 11 is cut longitudinally along an undulatory line to form the upper and lower segments 12$^a$ and 12$^d$. The line of cutting is indicated in dotted lines as 13, and after cutting, said segments are reversed and matched as in the other form described. Otherwise, the process is the same as that first described.

In any of the forms shown it will be appreciated that very beautiful and striking effects will be produced, and the boards 2, planks or segments so formed may be wrought into any kind of cabinet work, or furniture desired. It will also be appreciated that the material so produced is more durable and substantial than inlaid or mosaic work in wood, in that this improved wood, consisting of layers of veneer secured together and cut has great strength in all directions whereas the other is made up of fragments at the sacrifice of strength.

From the foregoing, it will be seen that I have provided a simple, inexpensive and efficient means for carrying out the objects of the invention and while I have particularly described the elements best adapted to perform the functions, it is obvious that various changes in the minor details and steps in the process may be resorted to, without departing from the spirit or sacrificing any of the principles of the invention.

Having thus described the invention, what I claim as new is:

The method of producing material for ornamental woodwork, consisting in the uniting and compressing of layers of veneer of varied colors to provide a plank having corrugated upper and lower faces, cutting the same diagonally to form a pair of segments, matching of said segments in reverse position and cutting layers longitudinally therefrom.

In testimony whereof I affix my signature in presence of two witnesses.

DILLARD REDMON.

Witnesses:
FRANCIS S. MAGUIRE,
WM. H. GROSS.